United States Patent [19]

Carlson

[11] Patent Number: 4,667,412
[45] Date of Patent: May 26, 1987

[54] SELF-MARKING MEASURING TAPE

[76] Inventor: Brian E. Carlson, 1459 E. Lassen Ave. #29, Chico, Calif. 95926

[21] Appl. No.: 903,040

[22] Filed: Sep. 2, 1986

[51] Int. Cl.⁴ .............................................. G01B 3/10
[52] U.S. Cl. ........................................ 33/138; 33/666
[58] Field of Search ............. 33/138, 414, 189, 137 R

[56] References Cited

U.S. PATENT DOCUMENTS

| | | | |
|---|---|---|---|
| 2,649,787 | 8/1953 | Kobayashi | 33/138 |
| 3,063,157 | 11/1962 | Keene | 33/189 |
| 3,526,964 | 9/1970 | Clark, Jr. | 33/138 |
| 3,838,520 | 10/1974 | Quenot | 33/138 |

Primary Examiner—Willis Little

[57] ABSTRACT

The invention provides a self-marking tape measure for hand-held use. A tape housing has a crosswise-positioned marker cartridge affixed removably in a marker cartridge channel through the housing base below the tape exit aperature. A marking substance like chalk or a soapstone composition formed into a three-surfaced triangular member with any edge being useful for marking comprises the marker cartridge. The marker cartridge is positioned in the marker cartridge channel and secured there by a spring-action snap lock. One edge of the marker cartridge protrudes downwardly through a slot in the tape housing base sufficiently to make a mark on a contacted surface when the tape housing is moved with a sideways motion. The points of two triangular sights in the upper opened walls of a tape support housing elongation are aligned with the protruding marker edge. The sights allow visual accurate tape measurements, and a sideways movement of the tape housing marks the measured position on a contacted surface. A storage compartment is provided in the tape housing for replacement marker cartridges.

6 Claims, 8 Drawing Figures

U.S. Patent  May 26, 1987  4,667,412
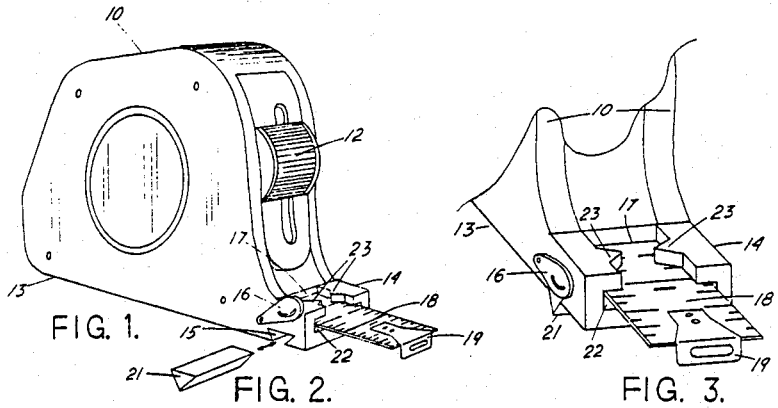
FIG. 1.
FIG. 2.
FIG. 3.
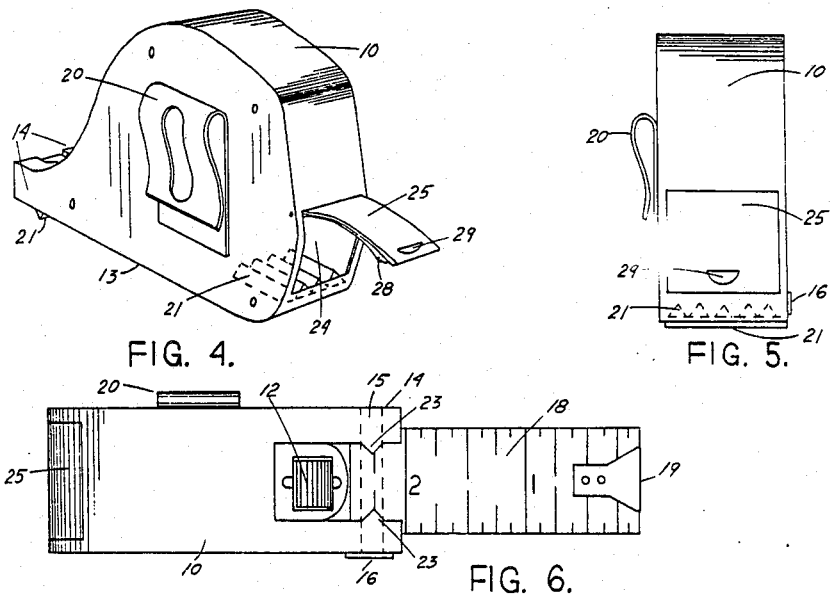
FIG. 4.
FIG. 5.
FIG. 6.
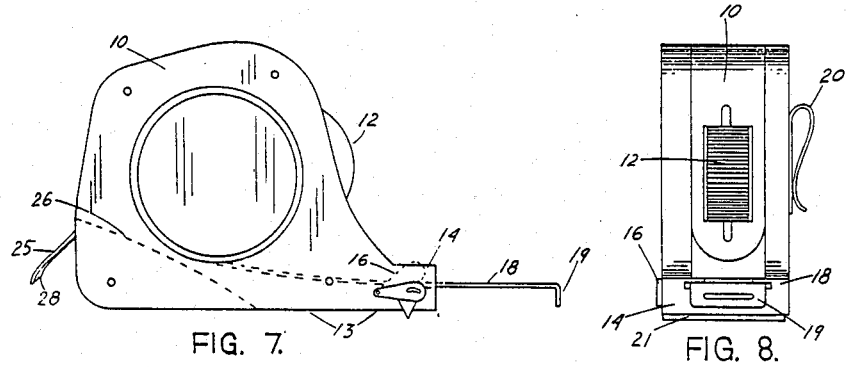
FIG. 7.
FIG. 8.

SELF-MARKING MEASURING TAPE

BACKGROUND OF THE INVENTION

1. Field of the Invention

This invention relates to measuring tapes of the automatic rewind variety used in the field of carpentry. The present invention is particularly directed towards a retractable measuring tape contained in a hand-held housing with the housing having a means for accurately marking a measured position. The housing marking means allows the user of the tape free movement of his other hand to accurately guide the tape for realignment without having to reach out and mark with a pencil. My device is particularly useful for overhead work.

2. Description of the Prior Art

Although patents seen representing development of prior art had markers in the housing, those illustrated showed predominently vertically-positioned pencil-holder or similar devices. With markers of this nature, an accurate marking of a measurement is difficult.

The patents examined which appear the most pertinent examples of the developing art are U.S. Pat. Nos. 2,807,886, 3,336,678, 3,731,389, 3,802,083, 4,015,337, 4,296,554, and 4,439,927.

It is to be noted also that the above described devices are not readily available in the market place, and that none of the above cited U.S. patents disclose a tape housing marker of close proximity to the present invention.

SUMMARY OF THE INVENTION

Therefore, in practicing my invention, I designed a retractable measuring tape housing having a horizontally positioned marker affixed removably below the tape exit aperature. A built-in receptacle retains a marking substance like chalk or a soapstone composition formed into a three-surfaced triangular configuration any edge thereof useful for marking. Cross-sectionally, the marking substance is equiangular to fit the housing receptacle of similar shape and have one edge protrude downwardly sufficiently for marking purposes. The marking substances are sized to transverse the housing receptacle edge to edge and be retained removeably therein by the cooperating shapes and manual spring release covers affixed externally to the tape housing sides. A door section located in the lower rear edge surface of the housing covers a storage compartment for replacement markers. For familiarity, the general mechanics and housing configuration common to retractable, hand-held measuring tapes is retained in my device.

A principal object of my invention is to provide a carpenter's measuring tape with a marking means affixed in the housing thereof.

Another object of the invention is to provide a retractable measuring tape with a simple, accurate marking means wherein the marking materials are readily replaceable when worn.

A further object of this invention is to provide a measuring tape with an adequate marking means so the user does not lose tape control while reaching for a pencil to mark a measured position.

Other objects and the many advantages of my invention will become better understood with a reading of the specification and considering the numbered parts therein with similarly numbered parts shown in the included drawings.

BRIEF DESCRIPTION OF THE DRAWINGS

FIG. 1 is a perspective drawing illustrating a preferred embodiment of the present invention;

FIG. 2 shows the three surfaced triangular marker cartridge positioned for insertion into the housing marker channel of FIG. 1;

FIG. 3 in a partial enlargement, shows the extended housing front of the self-marking tape measure illustrating the tape read and marker align sights and a marker channel snap lock;

FIG. 4 is a rear view of the tape measure housing in a perspective drawing showing the replacement marker storage compartment door opened;

FIG. 5 shows a wider housing embodiment of the tape measure from the rear with the compartment door closed;

FIG. 6 is a top plan view of the wider-housed, self-marking tape measure;

FIG. 7 shows a tape measure housing in a profile suitable for the various embodiments of the present invention; and FIG. 8 is a frontal view of a wider housed embodiment of the invention illustrating a framed side wall structure.

DRAWING REFERENCE NUMERALS 10 tape housing
12 lock control
13 housing base
14 extended housing front
15 marker holding channel
16 marker channel snap lock
17 tape blade aperture
18 tape blade
19 tape blade hook
20 belt clip
21 marker cartridge
22 tape track
23 tape read and marker align sights
24 replacement marker storage compartment
25 marker storage compartment hinged door
26 compartment divider wall
28 marker compartment double snap door latch
29 fingernail notch

DESCRIPTION OF THE PREFERRED EMBODIMENT

Referring now to the drawings and to FIG. 1, FIG. 2, and FIG. 3. In FIG. 1 tape housing 10 has lock control 12 positioned in a slot above extended housing front 14 which is an elongation of housing base 13. Extended housing front 14 provides a support structure for marker holding channel 15 positioned just below tape blade aperture 17 in direct alignment with tape read and marker alignment sights 23 seen above the tape track 22 in the top of extended housing front 14. Tape blade 18 is shown protruding from tape housing 10 through tape blade aperture 17 in tape track 22 with tape blade hook 19 affixed to the end thereof. Marker channel snap lock 16 is shown opened in FIG. 1 so marker cartridge 21 of FIG. 2 can be inserted into marker holding channel 15 in the housing base 13 of tape housing 10 in the extended housing front 14. Marker cartridge 21 is a three-edged plane in a triangular configuration manufactured of a marking substance or chalk. Marker cartridge 21 is sized to be inserted into marker holding channel 15 with one edge of marker cartridge 21 protruding downwardly through an opened bottom slot of marker holding channel 15. The downwardly protruding edge of marker cartridge 21 clears housing base 13 sufficiently to contact a secondary surface for purposes of making a mark thereon when tape housing 10 is pressed thereagainst and moved sideways. Marker cartridge 21 is retained in marker holding channel 15 by marker channel snap lock 16 which is a spring-activated hinged retainer openable for rotating or replacing marker cartridge 21.

FIG. 3 shows extended housing front 14 enlarged to illustrate the alignment of tape read and marker align sights 23. When tape blade 18 is extended for measuring and retained by tape blade hook 19, the measurement can be read from the top of extension housing front 14 at tape read and marker align sights 23. The tape can then be locked by lock control 12 and an accurately measured mark made by pressuring tape housing 10 against the surface to be marked and moving tape housing 10 sideways.

Additional marker cartridges 21 are carried in replacement marker storage compartment 24 in the rear wall of tape housing 10. Storage compartment hinged door 25 is opened by using finger nail notch 29 to release double snap latch 18. Double snap latch 18 provides a second security catch should door 25 get jarred open or not properly closed. Extra marker cartridges 21 are stored in compartment 24 as illustrated in FIG. 4 and FIG. 5. A storage compartment divider wall 26 provides storage compartment 24 with a seperated area from the spring return tape balde 18 wound inside tape housing 10 as illustrated in FIG. 7. In FIGS. 4, 5, 6, and 8, the positioning of marker channel snap lock 16 can be seen on the opposite side of tape housing 10 in relationship to belt hook 20. This is for cartridge replacement convenience and prevents an accidental opening of snap lock 16 by rubbing on the belt of the worker.

Although I have described embodiments of my invention with considerable details in the foregoing specification, it is to be understood that modifications in the design and structure may be made which remain within the scope of the appended claims.

What is claimed is:

1. A self-marking measuring tape comprising:
   a compartmented housing having a flattened base section with an elongated frontal projection;
   a spring-return, coiled, blade-type measuring tape received by said housing;
   means on a frontal portion of said housing to selectively lock the measuring tape in various extended positions; mechanical means inside the housing to effect the spring-return of said measuring tape functions upon release of said locking means;
   the elongated frontal projection of the housing base structured as an opened-top channel support track for extending and retreiving the tape blade;
   a marker retaining channel with an opened slot downwardly positioned cut through the housing base in the elongated frontal section;
   an elongated triangular marker cartridge; said downwardly positioned slot of sufficient width and length to allow one edge of said triangular marker cartridge fitted in the channel to protrude sufficiently for marking on a contacted surface by housing movement, said marker cartridge removably retained therein by a spring-action snap latch whereby the marker can be used with a sharper marking edge by turning the same and using a different edge thereof as each edge becomes worn;
   the marking edge of the marker cartridge aligned below the tape track in the front of the elongated housing base; two oppossing tape-read and alignment sights located at the opened top of the tape track wall surfaces in the elongated frontal housing base and positioned for precise cooperation with said marker cartridge; said sights being visable during the actuation of the locking means due to the length of said elongated frontal projection.

2. The self-marking measuring tape of claim 1, wherein the compartmented housing contains a marker cartridge storage compartment positioned oppositely from the elongated frontal base section in the back of the tape housing.

3. The marker cartridge storage compartment of claim 2, wherein a hinged door affixed in the rear vertical edge surface of the tape housing allows access to the marker cartridge storage compartment.

4. The hinged door of claim 3, wherein said door is structured with a double lined inner edge fittable to the inside of the door frame at the bottom as a double-action pressure lock for securing said door.

5. The hinged door of claim 3 and the locking protrusion of claim 4, wherein the said locking device through door material pliability is releasable by pressure against a fingernail slot having sufficient material reslience for opening, closing, and locking the door.

6. The self-marking tape as described in claim 1, wherein the alignment sights visably located in the opened top of the elongated housing base tape track walls are adjacently positioned triangular pointers sufficiently spaced for full tape incrument viewing and arranged in alignment with the marker cartridge protrusion through the marker retainer channel slot in the tape housing base.

* * * * *